US 7,882,622 B2

(12) United States Patent
Polsonetti et al.

(10) Patent No.: US 7,882,622 B2
(45) Date of Patent: Feb. 8, 2011

(54) APPARATUS AND METHOD FOR FABRICATING CATHODE COLLECTORS FOR LITHIUM/OXYHALIDE ELECTROCHEMICAL CELLS

(75) Inventors: Peter Polsonetti, Westwood, MA (US); Mihai Albu, Westford, MA (US); Moazzam Aziz, Winthrop, MA (US); Robert Yetman, West Roxbury, MA (US); Douglas Woodnorth, Needham, MA (US)

(73) Assignee: Electrochem Solutions, Inc., Clarence, NY (US)

( * ) Notice: Subject to any disclaimer, the term of this patent is extended or adjusted under 35 U.S.C. 154(b) by 1082 days.

(21) Appl. No.: 11/615,369

(22) Filed: Dec. 22, 2006

(65) Prior Publication Data

US 2007/0143989 A1    Jun. 28, 2007

Related U.S. Application Data

(60) Provisional application No. 60/752,867, filed on Dec. 22, 2005.

(51) Int. Cl.
| | |
|---|---|
| *H01M 10/04* | (2006.01) |
| *H01M 10/14* | (2006.01) |
| *H01M 4/82* | (2006.01) |
| *B05C 11/02* | (2006.01) |
| *B23P 19/00* | (2006.01) |

(52) U.S. Cl. .................. 29/730; 29/623.5; 118/100; 118/121; 429/233; 429/209

(58) Field of Classification Search .................. 29/730, 29/623.5; 429/157, 128, 209, 233; 264/126; 141/1.1, 32; 252/182.1; 205/109
See application file for complete search history.

(56) References Cited

U.S. PATENT DOCUMENTS

| | | | | |
|---|---|---|---|---|
| 3,108,909 | A | * | 10/1963 | Stanimirovitch ............ 429/157 |
| 3,310,437 | A | * | 3/1967 | Davee et al. .................. 429/94 |
| 3,377,202 | A | * | 4/1968 | Belove ........................ 205/109 |
| 3,634,569 | A | | 1/1969 | Emanuelson et al. |

(Continued)

FOREIGN PATENT DOCUMENTS

EP    0 717 454 A1    6/1996

(Continued)

OTHER PUBLICATIONS

Machine Translation of: JP08-250114, Tatsuo, Sep. 1996.*

(Continued)

*Primary Examiner*—Jonathan Crepeau
*Assistant Examiner*—Kenneth Douyette
(74) *Attorney, Agent, or Firm*—Michael F. Scalise

(57) ABSTRACT

An apparatus and method for fabricating continuous cathode collecters for use in lithium/thionyl chloride and lithium/sulfuryl chloride cells is described. The preferred electrically conductive material is acetylene black mixed with a polytetrafluroethylene (PTFE) binder in a dry, powderized form. The collector substrate is a nickel or stainless steel foil that has been expanded into a mesh or otherwise provided with perforations. A centering adjustment of the collector substrate controls loading of the electrically conductive mixture onto each side thereof. The dry, powdered electrically conductive mixture is then continuously fed into the calender and formed into a collector structure by locking to itself through the collector substrate perforations before being cut to size.

40 Claims, 8 Drawing Sheets

U.S. PATENT DOCUMENTS

| | | | |
|---|---|---|---|
| 3,438,912 A * | 4/1969 | Hiroshi et al. | 264/126 |
| 3,993,501 A | 11/1976 | Kalnoki-Kis | |
| 4,606,383 A * | 8/1986 | Yanik | 141/32 |
| 4,608,322 A | 8/1986 | Howard et al. | |
| 4,878,522 A * | 11/1989 | Ostrander | 141/1.1 |
| 5,096,611 A * | 3/1992 | Matthew et al. | 252/182.1 |
| 5,435,874 A | 7/1995 | Takeuchi et al. | |
| 5,593,462 A | 1/1997 | Gueguen et al. | |
| 6,174,622 B1 | 1/2001 | Thiebolt, III et al. | |
| 6,524,742 B1 | 2/2003 | Emanuel et al. | |
| 6,582,545 B1 | 6/2003 | Thiebolt, III et al. | |
| 6,780,542 B2 | 8/2004 | Spillman et al. | |
| 2003/0215710 A1 | 11/2003 | Lavoie et al. | |
| 2004/0010909 A1 | 1/2004 | Emanuel et al. | |
| 2004/0130061 A1 | 7/2004 | Lavoie et al. | |
| 2004/0159964 A1 | 8/2004 | Lavoie et al. | |

FOREIGN PATENT DOCUMENTS

| | | | |
|---|---|---|---|
| JP | 55025913 | | 2/1980 |
| JP | 06044960 A | * | 2/1994 |
| JP | 08250114 | | 9/1996 |
| JP | 11345608 | | 12/1999 |
| JP | 2000256705 | | 9/2000 |

OTHER PUBLICATIONS

Machine Translation of: JP 11-345608, Yoshio, Dec. 1999.*
Machine Translation of: JP 06-044960, Tokunaga et al., Feb. 1994.*

* cited by examiner

APPARATUS AND METHOD FOR FABRICATING CATHODE COLLECTORS FOR LITHIUM/OXYHALIDE ELECTROCHEMICAL CELLS

CROSS-REFERENCE TO RELATED APPLICATION

This application claims priority from provisional application Ser. No. 60/752,867, filed Dec. 22, 2005.

BACKGROUND OF THE INVENTION

1. Field of the Invention

The present invention generally relates to the art of electrochemical cells and, more particularly, to a lithium-containing cell with an electrically conductive counter-collector fabricated by a new continuous feed apparatus. In general, it has been discovered that electrically conductive materials, such as of a carbonaceous chemistry, can readily be compressed onto the opposed major sides of a perforated conductive collector substrate without sloughing off or delaminating. This makes the resulting carbonaceous laminate particularly useful as a cathode collector in lithium/oxyhalide cells.

2. Prior Art

Primary lithium oxyhalide cells are used extensively in applications requiring high gravimetric and volumetric energy density. Among the many sizes and chemistries available, cells can be developed for low rate or high rate applications and to operate from temperatures as low as −70° C. to as high as 200° C. The anode material usually consists of lithium or lithium alloyed with various elements such as aluminum, magnesium or boron and the cathode collector usually consists of some form of carbon held together using a suitable binder. The electrolyte generally consists of a solvent system of thionyl chloride, phosphoryl chloride or sulfuryl chloride. Often, additional compounds or interhalogen compounds such as sulfur dioxide, chlorine, bromine, bromine chloride and others may be dissolved therein to modify the cell for a particular purpose, such as extending the operating rate or temperature of the cell. Electrolyte salts are also added to the solvent system to assist in ionic transfer during cell discharge. Such salts may include lithium chloride in combination with aluminum trichloride or gallium trichloride. Lithium tetrachloroaluminate salt (LAC) or lithium tetrachlorogallate salt (LGC) is then formed in-situ. Typically used catholytes include chlorinated sulfuryl chloride (CSC) having either LAC or LGC dissolved therein. These systems are commonly referred to as LAC/CSC and LGC/CSC.

The liquid oxyhalides of the elements of Group V or Group VI of the Periodic Table are liquid active reducible cathode materials (depolarizer). As used herein and as disclosed in an article titled "Electrochemical Reactions in Batteries" by Akiya Kozawa and R. A. Powers, in the Journal of Chemical Education—Vol. 49, pages 587 to 591, September, 1972 edition, a cathode depolarizer is the cathode reactant and, therefore, is the material electrochemically reduced at the cathode collector. The cathode collector is not an active reducible material and functions as a current collector plus electronic conductor to the cathode terminal of the cell. In other words, the cathode collector is a situs for the electrochemical reduction reaction of the active cathode material and the electronic conductor to the cathode terminal.

A liquid active reducible cathode material (depolarizer) can either be employed by itself in an electrochemical device (i.e. galvanic cell), mixed with a conductive solute, which is a non-reactive material but is added to improve conductivity of the liquid active reducible cathode materials, or mixed with both a conductive solute and a reactive or non-reactive co-solvent. A reactive co-solvent material is one that is electrochemically active and, therefore, functions as an active cathode material while a non-reactive co-solvent is one that is electrochemically inactive and, therefore, cannot function as an active cathode material.

Any compatible solid which is substantially electronically conductive is useful as the cathode collector. However, it is desirable to have as much surface contact as possible between the cathode-electrolyte and the collector, and a pressed carbonaceous powder collector that provides a high surface area interface with the liquid cathode electrolyte is preferred. This means that the manufacturing process needs to produce collectors having uniform carbonaceous basis weights, which is defined as the gram amount of the carbonaceous material per unit volume, with little thickness variability across the collector sheet. Cells exhibiting consistent discharge performance from one cell to the next result when strict tolerances for these parameters are maintained.

SUMMARY OF THE INVENTION

Thus, the present invention is particularly directed to an apparatus and method for fabricating continuous cathode collectors for use in lithium/thionyl chloride and lithium/sulfuryl chloride cells. The preferred electrically conductive material is acetylene black mixed with a polytetrafluoroethylene (PTFE) binder in a dry, powderized form. The collector substrate is a nickel or stainless steel foil that has been expanded into a mesh or otherwise provided with perforations. The powdered electrically conductive mixture is then continuously fed into a calender and formed into a collector structure by locking to itself through the collector substrate perforations before being cut to size.

The key to this process is a feed hopper assembly and calender. The calender is directly below the feed hopper. The feed hopper includes two-chambered hoppers, one on each side of the collector substrate, a set of centering guide plates and a vibratory feeding system. Adjustments for the hopper assembly include centering the collector substrate with respect to the calender gap, regulating the distance from the end of the guide plates to the gap, and the vibratory feed speed. The centering adjustment controls loading of the electrically conductive mixture on each side of the collector substrate, although the process is fairly tolerant to this because the substrate is self-centering. The feed rate of the electrically conductive mixture delivered to the collector substrate is controlled by the distance from the end of the guide plates to the calender gap. The feed hoppers may also include high and low fill sensors that regulate the vibratory system to control the weight of the electrically conductive mixture in the hoppers. An agitator may be included so that the electrically conductive mixture is consistently "fluffed" and devoid of clumps that can lead to an uneven coating.

These and other objects and advantages of the present invention will become increasingly more apparent by a reading of the following description in conjunction with the appended drawings.

DETAILED DESCRIPTION OF THE PREFERRED EMBODIMENTS

Figure 1:
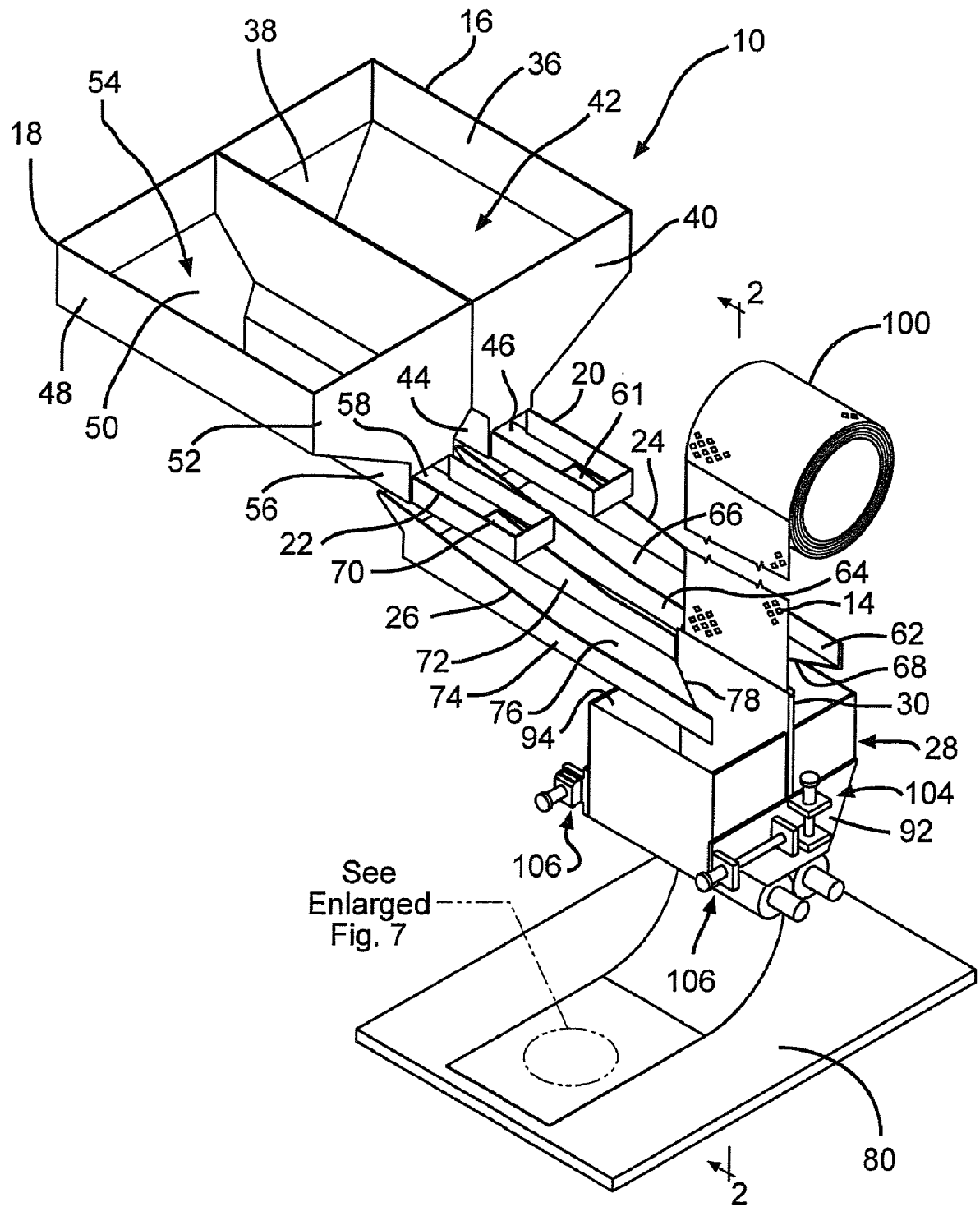
FIG. 1 is a perspective view of a perspective view of an apparatus 10 for fabricating a cathode current collector sheet according to the present invention.
Figure 2:
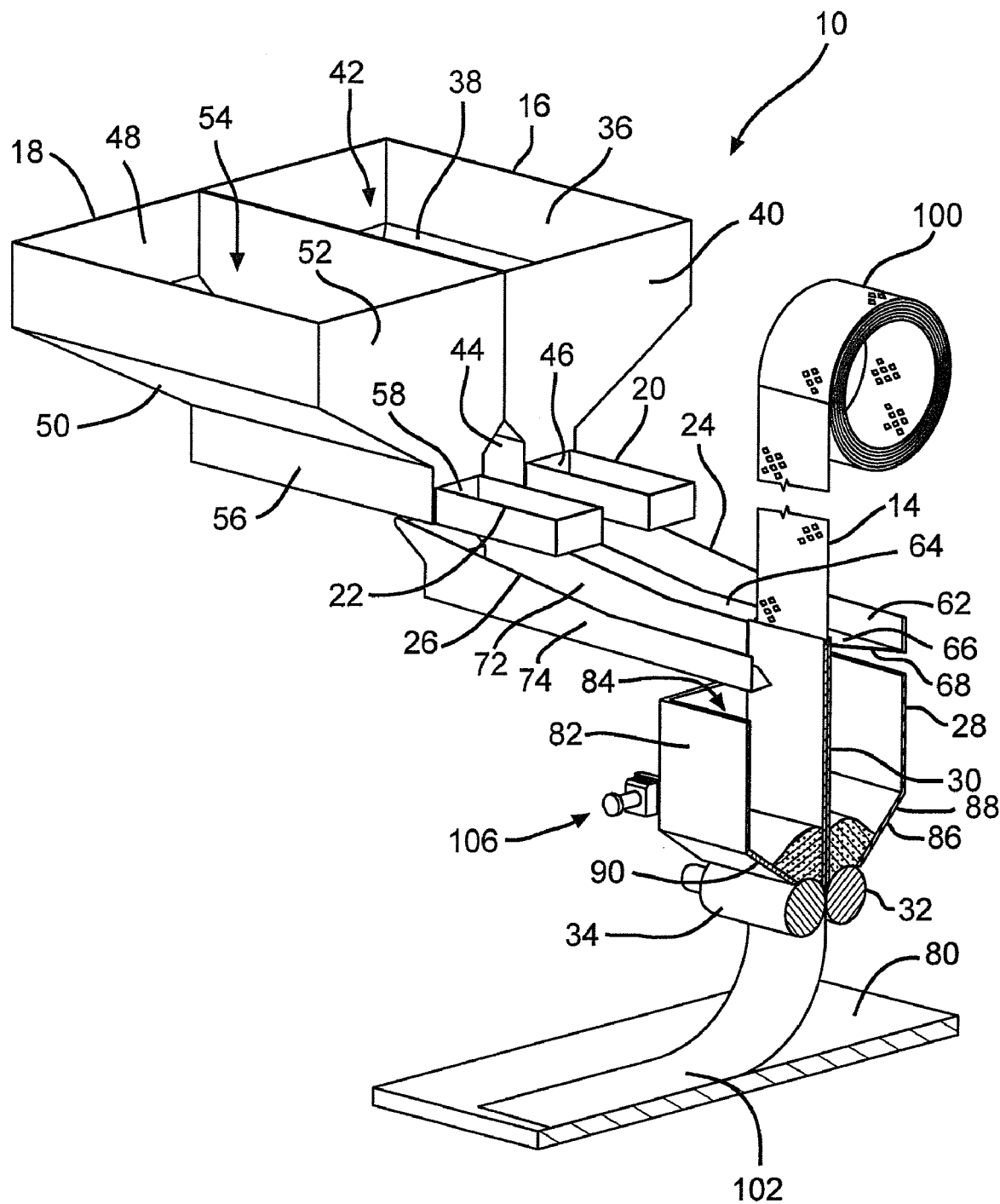
FIG. 2 is a perspective view of the apparatus 10 illustrated in FIG. 1, but partly broken away to show the carbonaceous material 12 being calendared to a metallic current collector 14.
Figure 3:
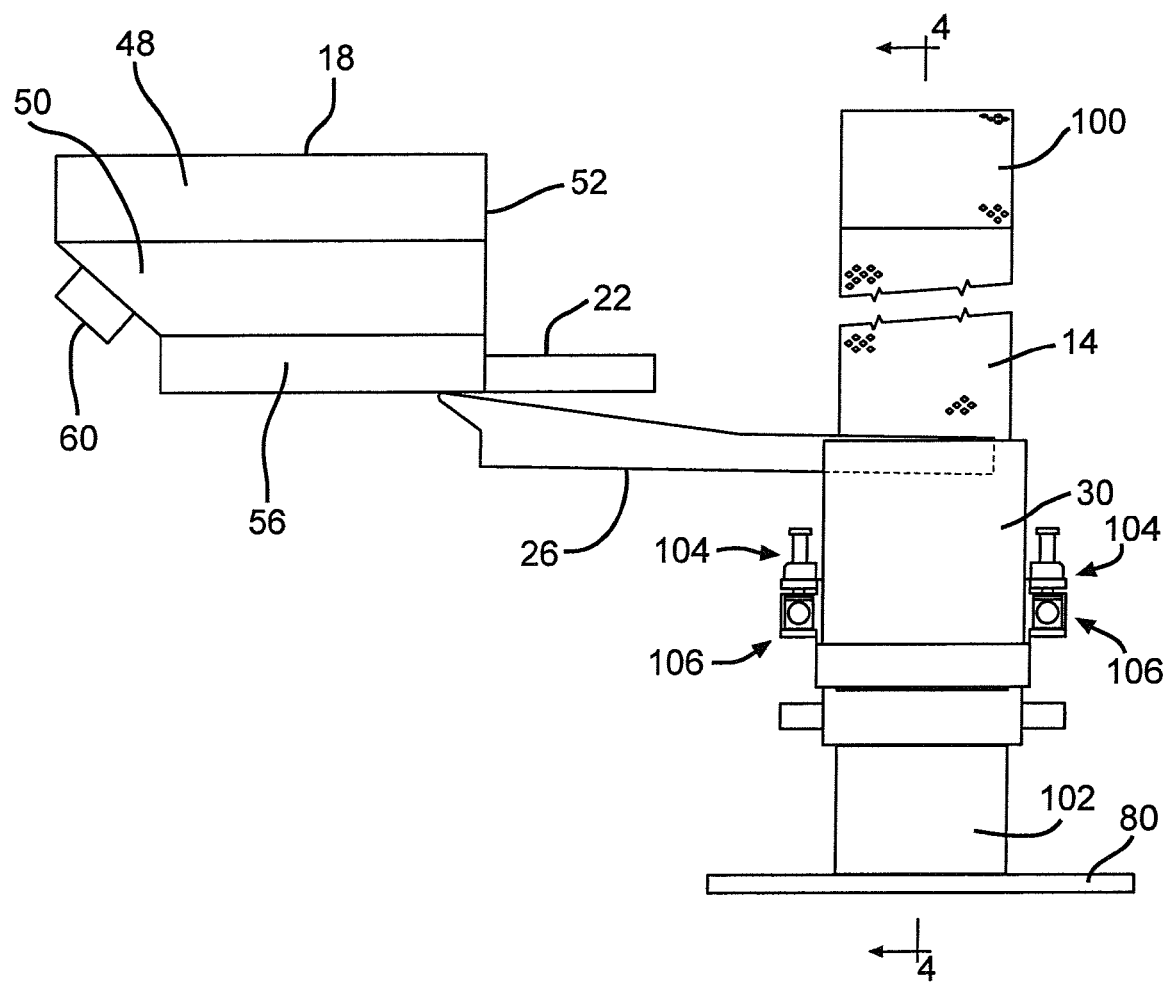
FIG. 3 is a front elevational view of the apparatus 10.

The present apparatus is particularly useful for manufacturing cathode collector structures such as pressed carbonaceous powder collectors for lithium/oxyhalide electrochemical cells. More particularly, however, the present apparatus is useful for manufacturing "electrode" structures for cells of both a primary and a secondary chemistry. The primary chemistry configuration can include a positive electrode of either a liquid catholyte system having an electrically conductive or electroactive material supported on a collector substrate or a solid cathode active material supported on a current collector.

Regardless the cell configuration, such cells preferably comprise an anode active material of a metal selected from Groups IA, IIA or IIIB of the Periodic Table of the Elements, including the alkali metals lithium, sodium, potassium, etc., and their alloys and intermetallic compounds including, for example, Li—Mg, Li—Si, Li—Al, Li—B, Li—Al—Mg and Li—Si—B alloys and intermetallic compounds. The preferred anode active material is lithium. A lithium alloy such as a lithium-aluminum alloy is also useful; however, the greater the amounts of aluminum present by weight in the alloy, the lower the energy density of the cell.

In a primary cell of either an oxyhalide chemistry or a solid positive electrode, the form of the anode may vary. Preferably the anode is a thin metal sheet or foil of lithium pressed or rolled on a metallic anode current collector, i.e., preferably comprising nickel. The anode current collector has an extended tab or lead contacted by a weld to a cell case of conductive metal in a case-negative electrical configuration. Alternatively, the anode may be formed in some other geometry, such as a bobbin shape, cylinder or pellet to allow an alternate low surface cell design.

In the case of oxyhalide chemistry, the cell comprises a cathode collector of electrically conductive material supported on a collector substrate. An oxyhalide cell operates in the following manner. When the ionically conductive catholyte solution becomes operatively associated with the anode and the cathode collector, an electrical potential difference develops between terminals operatively connected to the anode and to the cathode collector. The electrochemical reaction at the anode includes oxidation to form metal ions during cell discharge. The electrochemical reaction at the cathode collector involves conversion into atomic or molecular forms of those ions that migrate from the anode to the cathode collector. In addition, the halogen and/or interhalogen of the catholyte is believed to undergo a reaction or reactions with the nonaqueous solvent thereof resulting in the formation of a compound or complex which exhibits the observed open circuit voltage of the cell. Exemplary electrically conductive materials for the cathode collector include acetylene black, graphite, coke, carbon black, and carbon monofluoride contacted to a metal screen. A preferred electrically conductive material is acetylene black due to its relatively high lithium-retention capacity and because acetylene black carbonaceous particles have excellent mechanical properties that permit them to be fabricated into cathode collector structures.

A typical cathode collector is fabricated by dry mixing about 80 to 95 weight percent of at least one of the above listed electrically conductive materials, preferably acetylene black, with about 1 to 10 weight percent of a powdered conductive diluent and about 1 to 10 weight percent of a binder material, preferably a thermoplastic polymeric binder material. The term "dry" means that the electrically conductive mixture of the electrically conductive material and the conductive diluent is substantially free from liquids, especially water.

The term thermoplastic polymeric binder material is used in its broad sense and any polymeric material, preferably in a powdered form, which is inert in the cell and which passes through a thermoplastic state, whether or not it finally sets or cures, is included within the meaning of the term "thermoplastic polymer". Representative materials include polyethylene, polypropylene and fluoropolymers such as fluorinated ethylene and propylene, polyvinylidene fluoride (PVDF), polyethylenetetrafluroethylene (ETFE), and polytetrafluoroethylene (PTFE), the latter material being most preferred. Natural rubbers are also useful as the binder material with the present invention.

Suitable conductive diluents include carbon black and/or graphite. A preferred carbonaceous diluent is KETJEN-BLACK® carbon. Metals such as nickel, aluminum, titanium and stainless steel in powder form are also useful as conductive diluents when mixed with the above listed conductive materials. This mixture is then contacted to at least one major side, and preferably both major sides, of a perforated conductive substrate selected from the group consisting of nickel, copper, titanium, cobalt, tantalum, aluminum, stainless steel, and alloys thereof as a foil or screen. The conductive substrate preferably has a thickness of from about 0.001 inches to about 0.02 inches.

Referring now to the drawings, FIGS. 1 to 8 illustrate an apparatus 10 for calendaring an electrically conductive mixture 12 to a collector substrate 14. The thusly calendared electrically conductive structures are useful as cathode collectors for lithium/oxyhalide cells and as carbonaceous anodes for lithium ion cells, and the like. The apparatus 10 comprises a pair of side-by-side right and left material feed hoppers 16 and 18 leading to respective primary chutes 20 and 22 which, in turn, lead to respective secondary chutes 24 and 26. The secondary chutes 24, 26 deliver the electrically conductive mixture 12 to a calendar hopper 28 that is compartmentalized by an adjustable gate 30. The calender hopper 28 in conjunction with the gate 30 delivers the electrically conductive mixture 12 to a pair of side-by-side rollers 32 and 34 that calender the electrically conductive mixture onto opposite sides of the collector substrate 14 moving through the gate and the rollers 32, 34. The collector substrate movement is by the counter rotating action of the calendar rollers 32, 34.

The present apparatus 10 will first be more specifically described with respect to the right feed hopper 16, which is a mirror structure of the left feed hopper 18. The right feed hopper 16 comprises an upper vertical sidewall 36 supported on a downwardly and inwardly tapered sidewall 38 except for a vertical front wall 40. The vertical sidewall 36 and front wall 40 surround an open end 42 through which the electrically conductive mixture 12 is loaded into the hopper 16. The tapered sidewall 38 funnels to a hopper channel portion 44 extending to an outlet 46 in the front wall 40 through which the electrically conductive mixture 12 moves by gravity feed to the downwardly inclined primary chute 20. Preferably, a high and low fill sensor regulates a vibratory mechanism (not shown for hopper 16) mounted on the outside of the tapered sidewall 38 opposite the chute outlet 46 to control the weight of the electrically conductive mixture in the hopper.

Similarly, the left feed hopper 18 comprises an upper vertical sidewall 48 supported on a downwardly and inwardly tapered sidewall 50 except for a vertical front wall 52. The vertical sidewall 48 and front wall 52 surround an open end 54 through which the electrically conductive mixture 12 is loaded into the hopper 18. The tapered sidewall 50 funnels to a hopper channel portion 56 extending to an outlet 58 in the front wall 52 through which the electrically conductive mixture 12 moves by gravity feed to the downwardly inclined primary chute 22. Preferably, a high and low fill sensor regulates a vibratory mechanism 60 (FIG. 3) mounted on the outside of the tapered sidewall 50 opposite the chute outlet 58 to control the weight of the electrically conductive mixture in the hopper 18.

The primary chute 20 for the right hopper 16 is an elongated channel-shaped member extending from a proximal end located directly under the hopper outlet 46 to a distal end. An outlet 61 is provided in the primary chute 20 at its distal end. That way, the electrically conductive mixture 12 travels along the length of the primary chute 20 and falls through its outlet 61 to the secondary chute 24. The secondary chute 24 comprises opposed sidewalls 62 and 64 extending upwardly from a bottom wall 66. The secondary chute sidewall 62 extends forwardly beyond the terminus of the opposing chute sidewall 64. This provides the secondary chute bottom wall 66 with an angled edge 68 tapering inwardly from sidewall 62 to sidewall 64.

The primary chute 22 for the left hopper 18 is an elongated channel-shaped member extending from a proximal end located directly under the hopper outlet 58 to a distal end. An outlet 70 is provided in the primary chute 72 at its distal end. The secondary chute 26 also comprises an elongate channel-shaped member extending from a proximal end located directly under the primary chute opening 70 to a distal end. The secondary chute 22 comprises sidewalls 72 and 74 extending upwardly from a bottom wall 76. The secondary chute sidewall 74 extends forwardly beyond the terminus of the opposing chute sidewall 72. This provides the secondary chute bottom wall 76 with an angled edge 78 tapering inwardly from sidewall 74 to sidewall 72.

Figure 4:
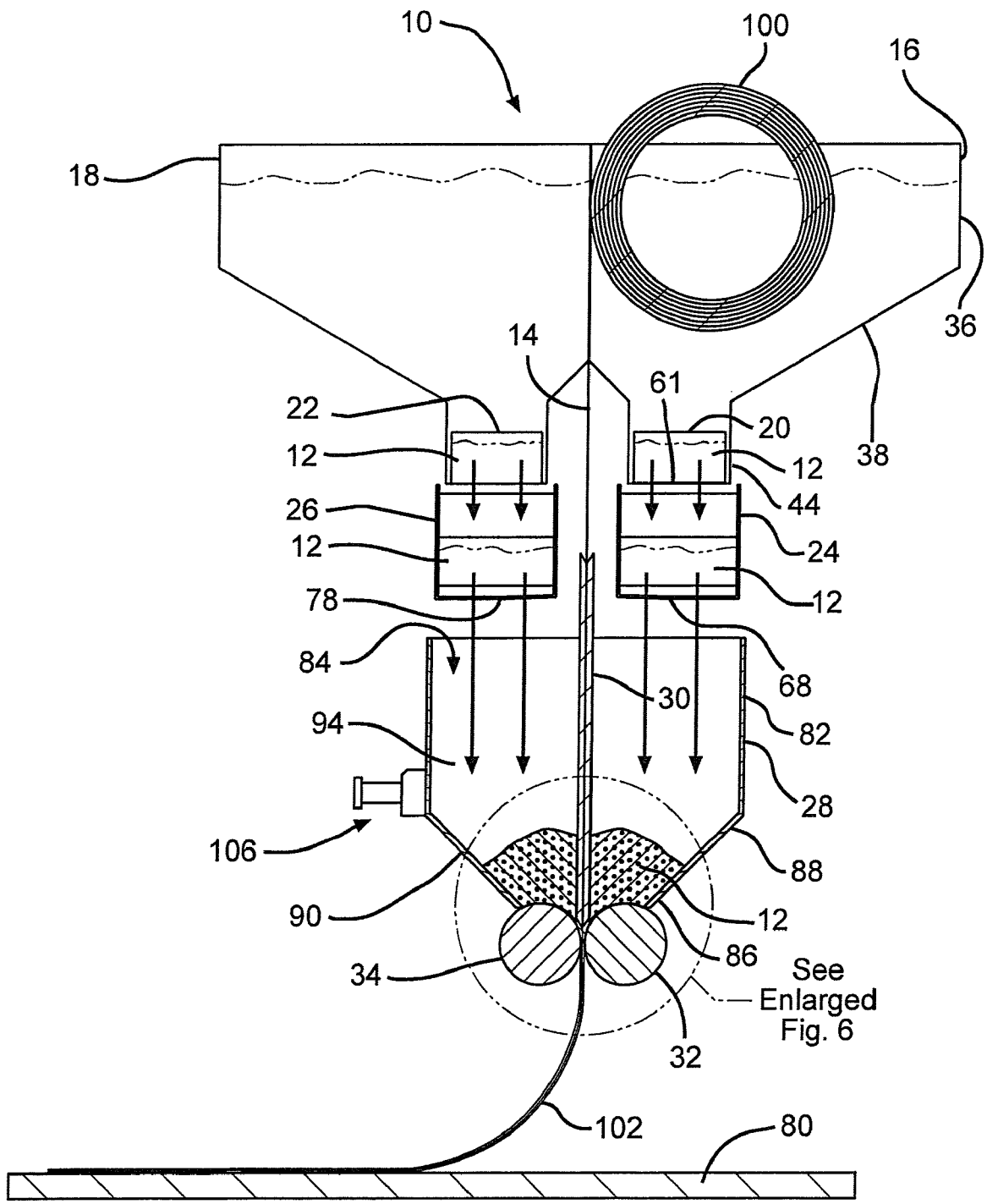
FIG. 4 is a cross-sectional view taken along line 4-4 of FIG. 3.
Figure 5:
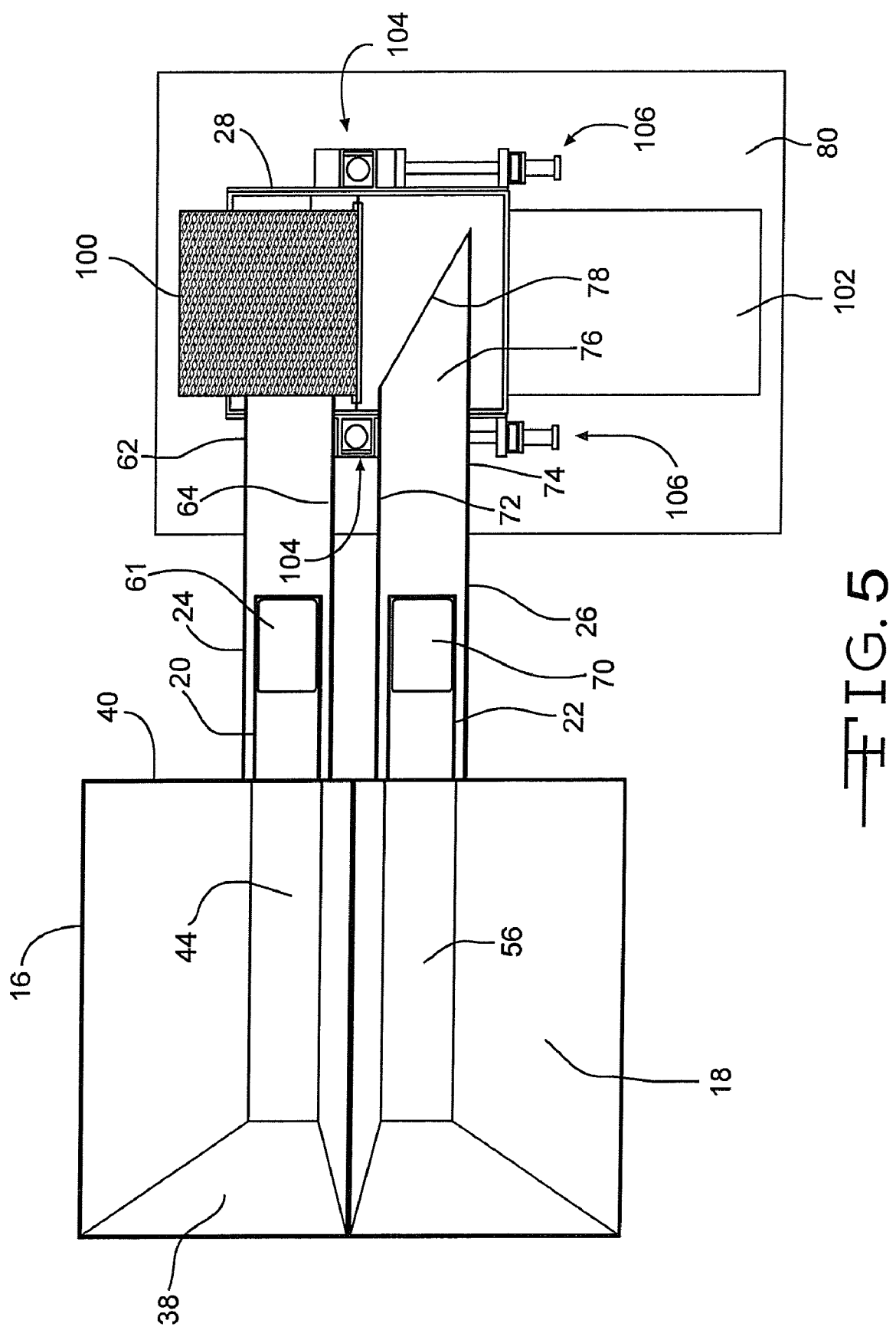
FIG. 5 is a plan view of the apparatus 10.
Figure 6:
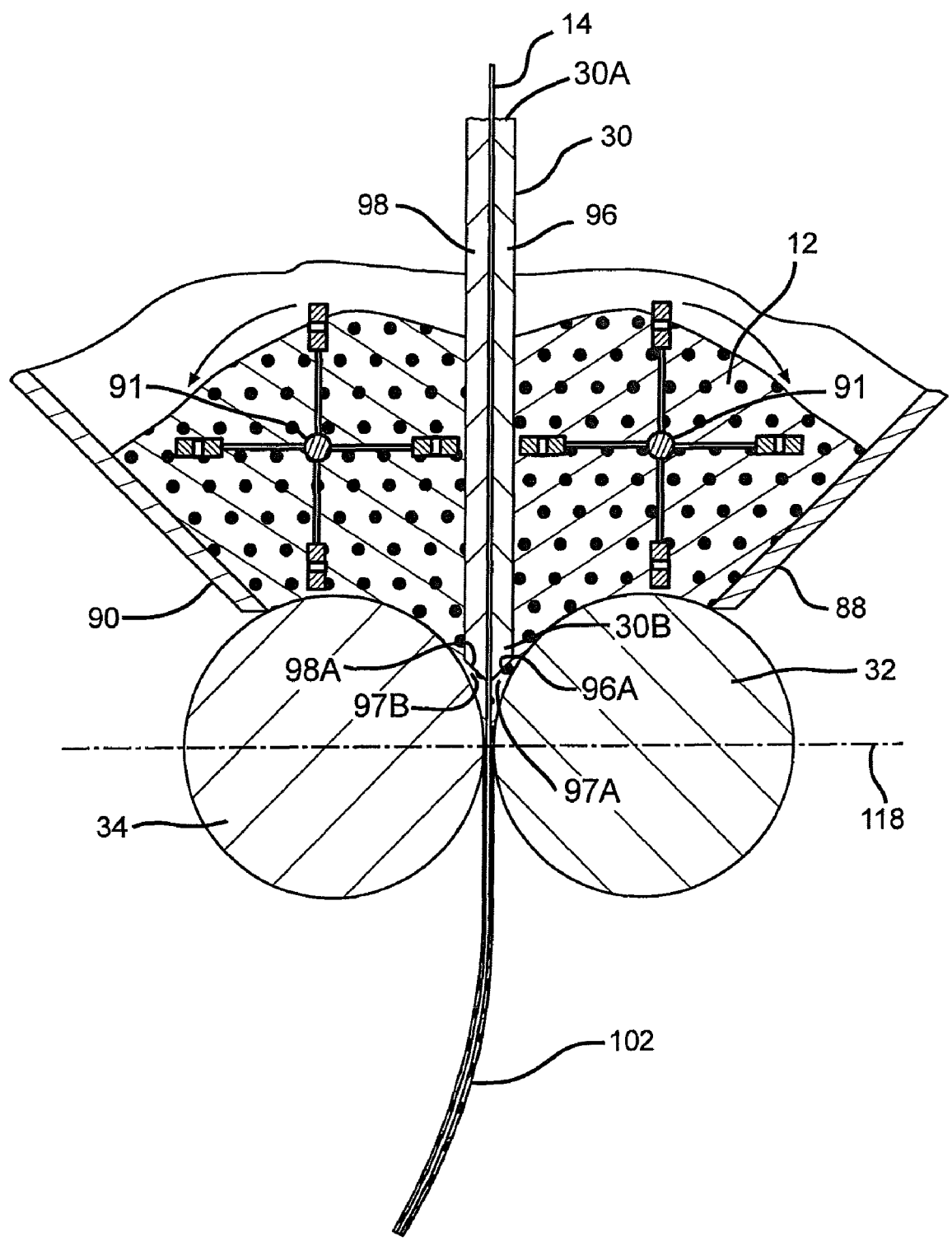
FIG. 6 is an enlarged view of the indicated area shown in FIG. 4.

As particularly shown in FIGS. 1 to 5 and 8, the side-by-side secondary chutes 24, 26 deliver the electrically conductive mixture 12 to the calender hopper 28. The calender hopper 28 is supported above a platform 80 and comprises a generally rectangular-shaped upper sidewall 82 extending to an opening 84 through which the electrically conductive mixture 12 leaving the secondary chutes 24, 26 drops. The calender hopper upper surrounding sidewall 82 confines the electrically conductive mixture as it moves downwardly into a funnel-shaped portion 86. The funnel-shaped portion 86 comprises angled sidewalls 88 and 90 extending to and meeting with front and back sidewalls 92 and 94. The angled sidewalls 88, 90 extend downwardly and inwardly to a closely-spaced relationship with the side-by-side rollers 32, 34 (FIGS. 4 and 6). The adjustable gate 30 bifurcates the calender hopper 28 into a right portion receiving the electrically conductive mixture from the right secondary chute 24 and a left portion receiving the electrically conductive mixture 12 from the left secondary chute 26. Preferably, agitators 91 are provided in the right and left calender hopper portions so that the electrically conductive mixture 12 is consistently "fluffed" and devoid of clumps that can lead to an uneven coating.

As more clearly shown in FIGS. 4 and 6, the gate 30 comprises a right plate 96 and a left plate 98 that are disposed in a vertical side-by-side orientation with a fixed gap there between. The current collector 14 unfurls from a spool 100 and moves in a downwardly direction to enter the gate 30 at its proximal end 30A to move through the fixed gap between the gate plates 96, 98 to the distal gate end 308 and then downwardly through and between the rollers 32, 34. Simultaneously, the electrically conductive mixture 12 is deposited in the calender hopper 28 evenly distributed from the front wall 92 to the back wall 94 thereof. This is because of the inwardly tapered edges 68, 78 of the respective secondary chutes 24, 26. As this happens, roller 32 rotates in a counter clockwise direction while roller 34 rotates in a clockwise direction. The plates 96, 98 are provided with respective beveled edges 96A and 98A angling upwardly and outwardly at the distal gate end 308. That way, calender gaps 97A and 97B are formed between the beveled edges 96A, 98A and the respective curved surfaces of the rollers 32, 34. The bevel gaps 97A, 97B regulate the thickness of the dry electrically conductive mixture 12 calendered on the opposed major sides of the collector substrate 14. Even though the electrically conductive mixture is compressed to a thickness less than the width of the calender gaps 97A, 97B, the coated thickness is directly related to these widths.

Figure 7:
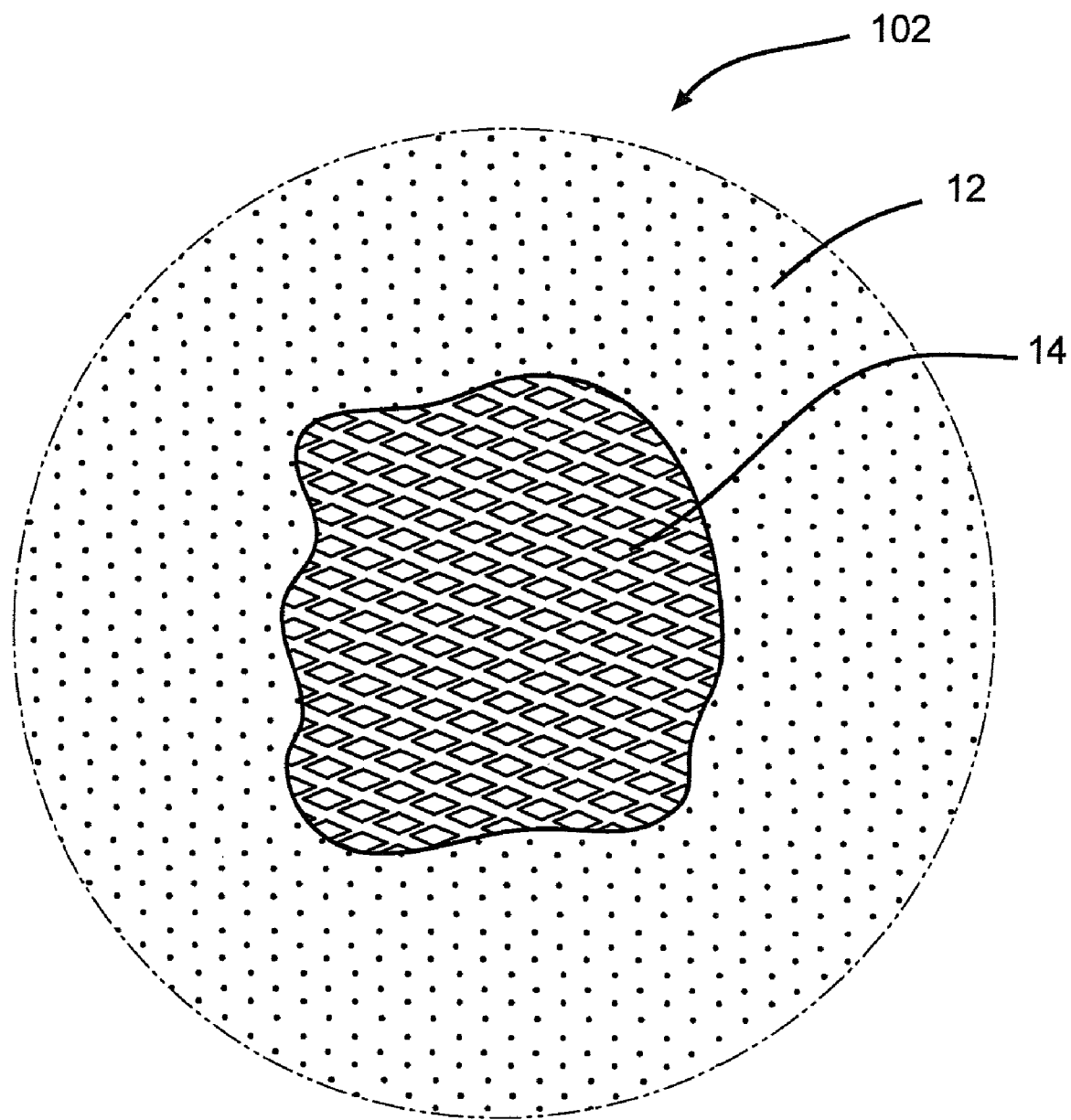
FIG. 7 is an enlarged view of the indicated area shown in FIG. 1.
Figure 8:
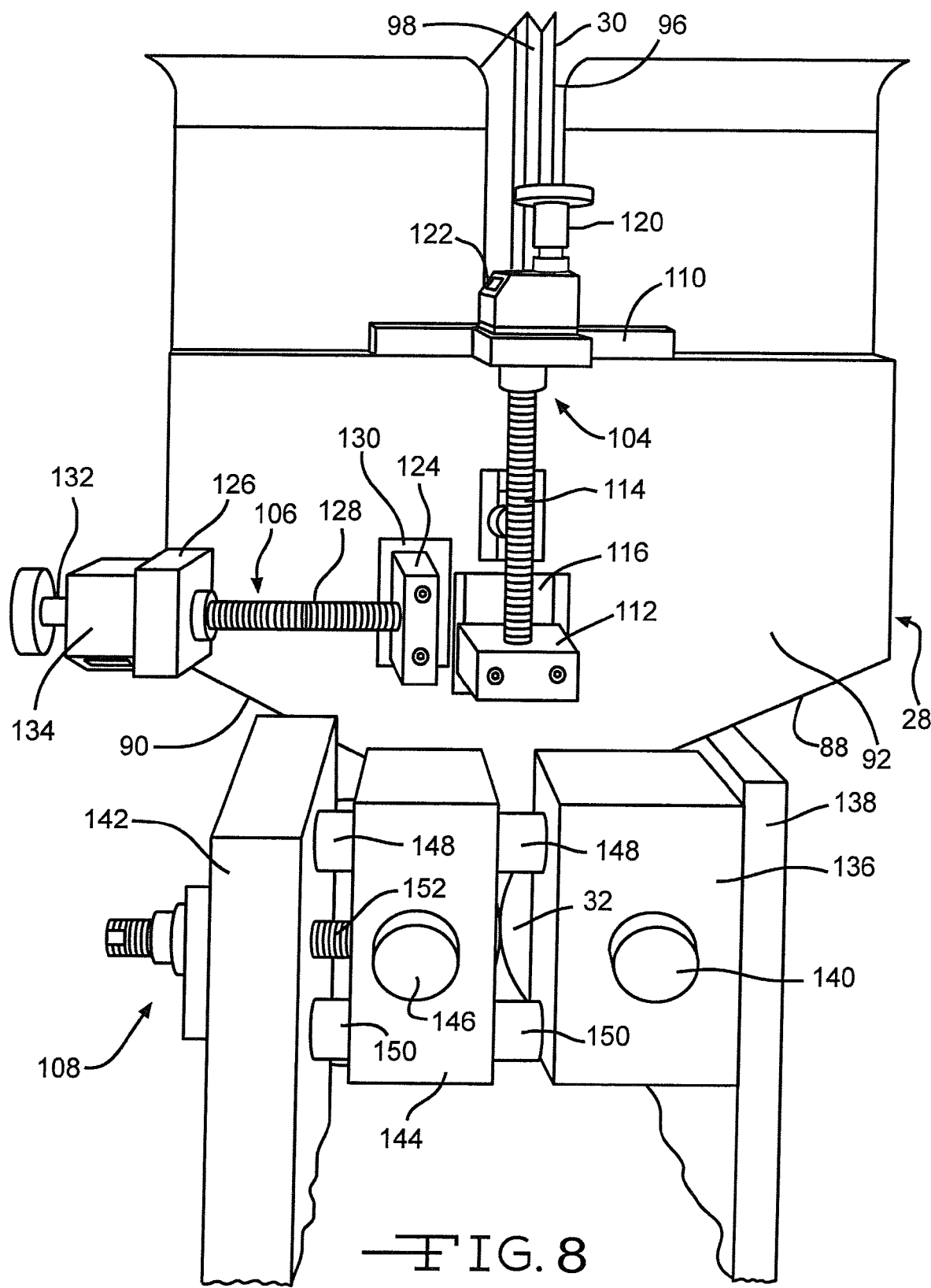
FIG. 8 is a detailed perspective view of the calender hopper 28 and its various adjustment mechanisms.

Thus, the rotating action of the rollers 32, 34 pulls the collector substrate 14 through the gate plates 96, 98 along with a regulated amount of the electrically conductive mixture 12 that is subsequently pressed in a smooth coating having a desired thickness onto the opposed major sides of the collector substrate 14. The resulting electrically conductive structure 102 comprising a regulated thickness of electrically conductive mixture laminated or otherwise coated onto the opposite sides of the collector substrate 14 is shown in FIGS. 4, 6 and 7.

In order to maintain the electrically conductive mixture coated at a regulated thickness onto each side of the collector substrate 14, apparatus 10 has several adjustable features. As particularly shown in FIG. 8, a first adjustable mechanism 104 provides for moving the gate 30 in an upwardly and downwardly vertical direction. A second adjustable mechanism 106 provides for moving the gate 30 back and forth in a sideways direction. Finally, a third adjustable mechanism 108 provides for moving at least one of the rollers 32, 34 to increase and decrease the gap between them. While the various adjustable mechanisms 104, 106 and 108 are shown as threaded members engaged with mating sliding blocks that is by way of representation only. The adjustable mechanism 104, 106 and 108 can also be hydraulic, pneumatic, or electrical actuated motors to accomplish the same functions.

More particularly, adjustable mechanism 104 comprises a horizontal bar 110 fixed to the right side of the calender hopper 28. A slidable block 112 is secured to the gate plates 96, 98 at the calender hopper sidewall 92. This block 112 has a threaded opening that receives a threaded member 114. Relative rotational movement between the threaded member 114 and the block 112 moves the block vertically along a slide 116 in the hopper sidewall 92 to either raise or lower the block 112. In turn, this causes the gate plates 96, 98 to move either in an upwardly or downwardly direction with respect to a horizontal axis 118 (FIG. 6) through the center of the rollers 32, 34. As the gate 30 moves in an upwardly direction, the calender gaps 97A, 97B between the beveled edges 96A, 98A of the plates 96, 98 and the respective rollers 32, 34 increases to thereby increase the loading of the electrically conductive mixture 12 coated onto the opposed collector substrate sides. Conversely, the calender gaps 97A, 97B between the beveled edges 96A, 98A and the rollers decrease as the gate 30 moves in a downwardly direction. This consequently decreases the electrically conductive mixture loaded onto the opposed collector substrate major sides. A hand crank 120 helps effect relative movement of the threaded member 114 and the block 112. A distance read-out 122 helps an operator make precise adjustments with the crank 120. As shown in FIGS. 1 to 5, adjustable mechanism 104 has a similar structure adjacent to calendar hopper sidewall 94.

Adjustable mechanism 106 comprises a vertical bar 124 fixed to the right sides of the gate plates 96, 98 at the calender hopper sidewall 92. A block 126 is secured to the calender hopper sidewall 92. This block 126 has a threaded opening that receives a threaded member 128. That way, relative rotational movement between the threaded member 128 and the block 126 moves the bar 124 along a horizontal slide 130. In turn, this movement causes the gate 30 including both plates 96, 98 to move laterally in a back and forth direction with respect to the rollers 32, 34. As the gate 30 moves toward angled sidewall 88 of the calender hopper 28, the calender gap 97A between the beveled edge 96A of gate plate 96 and the roller 32 decreases and the calender gap 97B between the beveled edge 98A of gate plate 98 and roller 34 increases. Conversely, as the gate 30 moves toward angled sidewall 90 of the calender hopper 28, the calender gap 97A between the beveled edge 96A of gate plate 96 and the roller 32 increases and the calender gap 97B between the beveled edge 98A of gate plate 98 and roller 34 decreases. A hand crank 132 helps effect relative movement of the threaded member 128 and the block 124. A distance read-out 134 helps an operator make precise adjustments with the crank 132. As shown in FIGS. 1 to 5, adjustable mechanism 106 has a similar structure adjacent to calender hopper sidewall 94.

Adjustable mechanism 108 comprises a stationary bar 136 fixed to the calender hopper sidewalls 88 and 92 by a plate 138. An axel 140 supports roller 32 for fixed rotational movement. A second plate 142 is fixedly connected to the calender hopper sidewalls 90 and 92. A laterally adjustable block 144 supports an axel 146 that provided for rotational movement of the other roller 34. Spaced apart pins 148 and 150 connect between the block 136 and plate 142. These pins 148, 150 allow the adjustable block 144 to ride back and forth there along. This actuating movement is brought about by a threaded member 152 having one end rotationally secured to the adjustable block 144 and the other end received in a threaded opening in the fixed second plate 142. That way, as the threaded member 152 is rotated in either a clockwise or counter clockwise direction, the adjustable block 144 including its axel 146 and supported roller 34 moves back and forth towards and away from the other roller 32 to decrease and increase the relative nip gap between them. Additionally, the adjustment mechanism 108 regulates the roller speed and, therefore, through-put. While not shown in the drawings, an adjustment crank along with a read-out helps an operator make these fine adjustments. A similar adjustable mechanism 108 resides on the opposite side of the calendar hopper 28 to adjust the opposite end of axel 146 in a uniform manner across the width of the collector substrate 14 moving through the gate 30.

The resulting electrically conductive structure 102 leaving the calender hopper 28 is a laminate of the electrically conductive mixture 12 compressed onto the opposed major sides of the perforated collector substrate 14 and is deposited onto the platform 80. The laminate may have a uniform basis weight on each side of the conductor substrate or the opposed sides may support uneven basis weights. Also, an operator can load different electrically conductive materials or mixtures of active materials onto opposed sides of the conductive substrate using the dual feed hoppers 16, 18 and the adjustable mechanisms 104, 106 and 108. As previously discussed, suitable electrically conductive active materials for a lithium/oxyhalide cell include acetylene black, graphite, coke, carbon black, and carbon monofluoride. So, in an exemplary lithium/oxyhalide cell, different ones of these materials can be contacted to the opposed substrate sides, or mixtures thereof with different constituent loadings.

In any event, the electrically conductive structure 102 maintains its structural integrity because the electrically conductive mixture 12 locks to itself through the perforations of the collector substrate 14. Also, the various adjustments 104, 106 and 108 ensure that the distance of the calender gaps 97A, 97B between the beveled edges 96A, 98A of the gate plates 96, 98 and the rollers 32, 34 are maintained as desired so that the electrically conductive mixture 12 is coated on the opposite collector substrate 14 sides in even and regulated thicknesses ranging from about 0.020 inches to about 0.25 inches and with desired basis weights. This is important for electrochemical cells to have consistent discharge characteristics from cell to cell in a build run and also from one build run to the next. Then, the electrically conductive structure 102 can either be rolled up onto a spool (not shown) for later processing or cut into lengths suitable for an electrochemical cell in the process of being built. If desire, the electrically conductive structure 102 can also be heated to up to about 300° C. in a post processing sintering step. This helps to cure or set the thermoplastic binder to ensure structural integrity.

Other electrically conductive materials useful for constructing an electrode of either a primary or a secondary electrochemical cell are selected from fluorinated carbon, a metal, a metal oxide, a metal sulfide or a mixed metal oxide. Such electrode active materials include silver vanadium oxide, copper silver vanadium oxide, manganese dioxide, titanium disulfide, copper oxide, copper sulfide, iron sulfide, iron disulfide, cobalt oxide, nickel oxide, copper vanadium oxide, and other materials typically used in alkali metal electrochemical cells.

Suitable fluorinated carbons are represented by the formula $(CF_x)_n$ wherein x varies between about 0.1 to 1.9 and preferably between about 0.5 and 1.2 and $(C_2F)_n$ and wherein the n refers to the number of monomer units, which can vary widely. These electrode active materials are composed of carbon and fluorine, and include graphitic and nongraphitic forms of carbon, such as coke, charcoal or activated carbon.

In secondary or lithium-ion cells, the positive electrode preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

To discharge such secondary cells, the lithium ions comprising the positive electrode intercalated into a carbonaceous negative electrode or anode by applying an externally generated electrical potential to recharge the cell. The applied recharging electrical potential serves to draw the lithium ions from the cathode material, through the electrolyte and into the carbonaceous anode to saturate the carbon comprising the anode. The cell is then provided with an electrical potential and is discharged in a normal manner.

An alternate secondary cell construction comprises intercalating the carbonaceous material with the active lithium material before the negative electrode is incorporated into the cell. In this case, the positive electrode body can be solid and comprise, but not be limited to, such materials as manganese dioxide, silver vanadium oxide, titanium disulfide, copper oxide, copper sulfide, iron sulfide, iron disulfide and fluorinated carbon. However, this approach is compromised by problems associated with handling lithiated carbon outside of the cell. Lithiated carbon tends to react when contacted by air or water.

The positive electrode for a primary or a secondary cell is prepared in a similar manner as previously described with respect to fabrication of a cathode collector for an oxyhalide cell. In that respect, the positive electrode is prepared by mixing about 80 to 99 weight percent of an already prepared electrically conductive material in a finely divided form with about 1 to 10 weight percent of a powdered conductive diluent and about 1 to 10 weight percent of a binder material. Suitable conductive diluents and binder materials have already been described.

Similarly, if the active material is a carbonaceous counter electrode in a secondary cell, the electrode material preferably includes a conductive diluent and a binder material in a similar manner as the previously described primary, solid cathode electrochemical cell.

Electrodes prepared as described above are flexible and may be in the form of one or more plates operatively associated with at least one or more plates of a counter electrode material, or in the form of a strip wound with a corresponding strip of counter electrode material in a structure similar to a "jellyroll".

For oxyhalide chemistries, the cell further comprises a nonaqueous, ionically conductive catholyte operatively associated with the anode and the cathode collector. In a cell chemistry having a solid positive electrode, the anode and cathode electrodes are activated with an ionically conductive electrolyte. In either case, the catholyte and the electrolyte serve as a medium for migration of ions between the anode and the cathode collector in the case of the oxyhalide chemistry and between the anode and the cathode electrodes in the solid positive electrode chemistry during the cell's electrochemical reactions.

For an oxyhalide cell, suitable nonaqueous solvent depolarizers exhibit those physical properties necessary for ionic transport, namely, low viscosity, low surface tension and wettability. In the case of a catholyte, suitable nonaqueous depolarizers are comprised of an inorganic salt dissolved in a nonaqueous codepolarizer system and, more preferably, a lithium metal salt dissolved in a catholyte solution comprising a halogen and/or interhalogen dissolved in a nonaqueous solvent. The halogen and/or interhalogen serve as a soluble depolarizer. They also can serve as a cosolvent in the electrochemical cell. The halogen is selected from the group of iodine, bromine, chlorine or fluorine while the interhalogen is selected from the group of ClF, $ClF_3$, ICl, $ICl_3$, IBr, $IF_3$, $IF_5$, BrCl, BrF, $BrF_3$, $BrF_5$, and mixtures thereof. The mole ratio of any one of the above-referenced halogens and/or interhalogens dissolved in any one of the above-referenced nonaqueous organic or inorganic solvents is from about 1:6 to about 1:1.

The nonaqueous solvent depolarizer may be one of the organic solvents which is substantially inert to the anode and electrically conductive collector materials such as tetrahydrofuran, propylene carbonate, acetonitrile, dimethyl sulfoxide, dimethyl foramide, dimethyl acetamide and in particular halogenated organic solvents such as 1,1,1,2,3,3,3-heptachloropropane or 1,4-difluorooctachlorobutane. The nonaqueous solvent depolarizer also may be one or a mixture of more than one of the inorganic solvents which can serve as both a solvent and a depolarizer such as thionyl chloride, sulfuryl chloride, selenium oxychloride, chromyl chloride, phosphoryl chloride, phosphorous sulfur trichloride and others. The ionic conductivity of the nonaqueous catholyte solution is preferably facilitated by dissolving a lithium salt in the nonaqueous depolarizer. Examples of lithium salts are lithium halides such as LiCl and LiBr and lithium salts of the $LiMX_n$ type, such as $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, LiSCN, $LiO_3SCF_2CF_3$, $LiC_6F_5SO_3$, $LiO_2$, $LiO_2CCF_3$, $LiSO_3F$, $LiB(C_6H_5)_4$, $LiCF_3SO_3$, and mixtures thereof. Suitable salt concentrations typically range between about 0.25 to about 1.5 molar. Thus, the solution of halogen and/or interhalogens, the nonaqueous solvent depolarizer and, optionally, the ionic salt, serve as the codepolarizer and catholyte of the oxyhalide cell.

In electrochemical systems of either a primary or a secondary chemistry having a solid cathode or solid positive electrode, the nonaqueous solvent system comprises low viscosity solvents including tetrahydrofuran (THF), methyl acetate (MA), diglyme, trigylme, tetragylme, dimethyl carbonate (DMC), ethylmethyl carbonate (EMC), 1,2-dimethoxyethane (DME), diisopropylether, 1,2-diethoxyethane, 1-ethoxy, 2-methoxyethane, dipropyl carbonate, ethylmethyl carbonate, methylpropyl carbonate, ethylpropyl carbonate, diethyl carbonate, and mixtures thereof. While not necessary, the electrolyte also preferably includes a high permittivity solvent selected from cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-butyrolactone (GBL), γ-valerolactone, N-methyl-pyrrolidinone (NMP), and mixtures thereof. The nonaqueous solvent system also includes at least one of the previously described lithium salts in a concentration of about 0.8 to about 1.5 molar. For a solid cathode primary or secondary cell having lithium as the anode active material, such as of the Li/SVO couple, the preferred electrolyte is $LiAsF_6$ in 50:50, by volume, mixture of PC/DME. For a $Li/CF_x$ cell, the preferred electrolyte is 1.0M to 1.4M $LiBF_4$ in γ-butyrolactone (GBL).

When the mechanical structure or configuration of the cell requires, a separator is employed to provide physical separation between the anode and the cathode collector for the oxyhalide cell and between the anode and the cathode in a solid positive electrode chemistry. The separator is of electrically insulative material, and the separator material also is chemically unreactive with the counter electrode materials and both chemically unreactive with and insoluble in the catholyte or the electrolyte, as the case may be. In addition, the separator material has a degree of porosity sufficient to allow flow therethrough of the catholyte or the electrolyte during the electrochemical reaction of the cell.

Illustrative separator materials include woven and nonwoven fabrics of polyolefinic fibers or fluoropolymeric fibers including polyethylenetetrafluoroethylene, polyvinylidene fluoride, and polyethylenechlorotrifluoroethylene laminated or superposed with a polyolefinic or a fluoropolymeric microporous film. Suitable microporous films include a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXI- GLAS (C. H. Dexter, Div., Dexter Corp.). The separator may also be composed of non-woven glass, glass fiber materials and ceramic materials.

The form of the separator typically is a sheet which is placed between the anode and the cathode collector or between the negative and the positive electrodes, and in a manner preventing physical contact there between. Such is the case when the anode is folded in a serpentine-like structure with a plurality of cathode current collector plates or positive electrode plates disposed intermediate the anode folds and received in a cell casing or when the electrode combination is rolled or otherwise formed into a cylindrical "jellyroll" configuration.

The assembly of the cell described herein is preferably in the form of a wound element cell. That is, the fabricated cathode collector or positive electrode, the anode or negative electrode and the separator are wound together in a "jellyroll" type configuration or "wound element cell stack" such that the anode or negative electrode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with components of the cell.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The cathode collector or positive terminal pin feedthrough preferably comprises titanium although molybdenum, aluminum, nickel alloy, or stainless steel can also be used. The cell header comprises elements having compatibility with the other components of the electrochemical cell and is resistant to corrosion. The cathode collector or positive electrode lead is welded to the positive terminal pin in the glass-to-metal seal and the header is welded to the case containing the electrode stack. The cell is thereafter filled with the catholyte or electrolyte solution described hereinabove and hermetically sealed such as by close-welding a stainless steel ball over the fill hole, but not limited thereto.

The above assembly describes a case-negative cell, which is the preferred construction of the exemplary cell chemistries of the present invention. As is well known to those skilled in the art, the exemplary electrochemical systems can also be constructed in case-positive configurations.

It is apppreciates that various modifications to the invention concepts described herein may be apparent to those of ordinary skills in the art without departing from the scope of the present invention as defined by the appended claims.

What is claimed is:

1. An apparatus for contacting an electrically conductive material to a collector substrate, the apparatus comprising:
    a) a calender hopper containing the electrically conductive material and comprising front and back hopper walls meeting with first and second sidewalls extending downwardly to first and second lower edges thereof;
    b) a pair of side-by-side first and second counter rotatable calender rollers, wherein the lower edges of the first and second hopper sidewalls are in a closely-spaced relationship with respective ones of the first and second calendar rollers at locations spaced from a nip there between;
    c) a gate comprising first and second side-by-side gate plates dividing the calender hopper into a first hopper portion and a second hopper portion, wherein the first and second gate plates provide an axial path from a proximal gate end that receives a leading end of the collector substrate to a distal gate end comprising first and second distal plate ends provided in an adjustable, spaced relationship at locations above the nip, but axially distal of an imaginary horizontal line defined by the lower edges of the first and second hopper sidewalls provided in the closely-spaced relationship with the respective first and second rollers; and
    d) wherein the collector substrate is moveable in an axial direction through the gate from the proximal gate end to the distal gate end by counter rotatable movement of the first and second rollers contacting the opposed major sides of the collector substrate at the nip of the rollers with a regulated quantity of the electrically conductive material being contactable from the first and second hopper portions to the opposed major sides of the collector substrate by adjusting a calender distance between the first and second distal plates ends and the respective first and second rollers.

2. The apparatus of claim 1 further including a feed hopper that initially contains the electrically conductive material and comprising an outlet leading to a chute that receives the electrically conductive material and moves it to the calender hopper.

3. The apparatus of claim 2 wherein the feed hopper includes a vibratory mechanism for help in moving the electrically conductive material to the chute.

4. The apparatus of claim 1 wherein the gate bisects the calender hopper and is in a vertical orientation with respect to an axis through respective rotational axes of the first and second rollers and the nip there between.

5. The apparatus of claim 1 wherein the first and second gate plates are respectively beveled upwardly and outwardly at their distal gate ends.

6. The apparatus of claim 1 wherein the gate is adjustable upwardly and downwardly with respect to the calender distance provided by the closely-spaced relationship with the lower edges of the first and second hopper sidewalls and the respective first and second rollers.

7. The apparatus of claim 1 wherein the gate is laterally adjustable towards and away from either the first or the second roller.

8. The apparatus of claim 1 wherein the nip between the first and second rollers is adjustable.

9. The apparatus of claim 1 wherein the electrically conductive material is substantially dry.

10. The apparatus of claim 1 wherein the electrically conductive material is selected from the group consisting of acetylene black, graphite, coke, carbon black, carbon monofluoride, and mixtures thereof.

11. The apparatus of claim 1 wherein the electrically conductive material includes a conductive diluent.

12. The apparatus of claim 11 wherein the conductive diluent is selected from the group consisting of a thermoplastic polymer, natural rubber, and a metallic powder.

13. The apparatus of claim 2 wherein the feed hopper comprises first and second feed hoppers for supplying the electrically conductive material to the respective first and second portions of the calender hopper.

14. The apparatus of claim 2 wherein the first and second feed hoppers lead to respective chutes having angled distal edges that evenly distribute the electrically conductive material across a width of the opposed major sides of the conductive substrate.

15. The apparatus of claim 2 wherein the first and second feed hoppers hold different electrically conductive materials.

16. The apparatus of claim 2 wherein the first and second feed hoppers hold mixtures of two or more electrically conductive materials at different loadings.

17. The apparatus of claim 2 wherein the first and second feed hoppers hold mixtures of at least one electrically conductive material and at least one conductive diluent at different loadings.

18. The apparatus of claim 2 wherein the feed hopper includes sensors for regulating the level of the electrically conductive material contained therein.

19. The apparatus of claim 1 wherein the calender hopper includes an agitator for maintaining the electrically conductive material in a fluffed state.

20. The apparatus of claim 1 wherein the collector substrate is a perforated structure selected from the group consisting of nickel, copper, titanium, cobalt, tantalum, aluminum, stainless steel, and alloys thereof as a foil or screen.

21. The apparatus of claim 1 wherein the electrically conductive material is at a different thickness on the opposed major sides of the conductive substrate.

22. An apparatus for contacting an electrically conductive material to a collector substrate, the apparatus comprising:
 a) first and second feed hoppers that initially contain the electrically conductive material, each of them comprising an outlet;
 b) first and second chutes that receive the electrically conductive material from the outlets of the first and second feed hoppers and have angled distal chute edges;
 c) a calender hopper that receives the electrically conductive material from the first and second chutes, the calender hopper comprising front and back hopper walls meeting with first and second sidewalls extending downwardly to first and second lower edges thereof;
 d) a pair of side-by-side first and second counter rotatable calender rollers, wherein the lower edges of the first and second hopper sidewalls are in a closely-spaced relationship with respective ones of the first and second calendar rollers at locations spaced from a nip there between;
 e) a gate comprising first and second side-by-side gate plates dividing the calender hopper into a first hopper portion and a second hopper portion, wherein the first and second gate plates provide an axial path from a proximal gate end that receives a leading end of the collector substrate to a distal gate end comprising first and second distal plate ends provided in an adjustable, spaced relationship at locations above the nip, but axially distal of an imaginary horizontal line defined by the lower edges of the first and second hopper sidewalls provided in the closely-spaced relationship with the respective first and second rollers and wherein the angled distal edges of the first and second chutes evenly distribute the electrically conductive material into the calender hopper and across a width of the opposed majors sides of the conductive substrate; and
 f) wherein the collector substrate is moveable in an axial direction through the gate from the proximal gate end to the distal gate end by counter rotatable movement of the first and second rollers contacting opposed major sides of the collector substrate at the nip of the rollers with a regulated quantity of the electrically conductive material being contactable from the first and second hopper portions to the opposed major sides of the collector substrate by adjusting a calender distance between the first and second distal plate ends and the respective first and second rollers.

23. The apparatus of claim 22 wherein the gate bisects the calender hopper and is in a vertical orientation with respect to an axis through respective rotational axes of the first and second rollers and the nip there between.

24. The apparatus of claim 22 wherein the first and second gate plates are respectively beveled upwardly and outwardly at their distal gate ends.

25. The apparatus of claim 22 wherein the gate is adjustable upwardly and downwardly with respect to the calender distance provided by the closely-spaced relationship with the lower edges of the first and second sidewalls and the respective first and second rollers.

26. The apparatus of claim 22 wherein the gate is laterally adjustable towards and away from either the first or the second roller.

27. The apparatus of claim 22 wherein the nip between the first and second rollers is adjustable.

28. The apparatus of claim 22 wherein the electrically conductive material is substantially dry.

29. The apparatus of claim 22 wherein the electrically conductive material is selected from the group consisting of acetylene black, graphite, coke, carbon black, carbon monofluoride, and mixtures thereof.

30. The apparatus of claim 22 wherein the electrically conductive material includes a conductive diluent.

31. The apparatus of claim 22 wherein the first and second feed hoppers hold different electrically conductive materials.

32. The apparatus of claim 22 wherein the first and second feed hoppers hold mixtures of two or more electrically conductive materials at different loadings.

33. The apparatus of claim 22 wherein the first and second feed hoppers hold mixtures of at least one electrically conductive material and at least one conductive diluent at different loadings.

34. The apparatus of claim 22 wherein the electrically conductive material is at a different thickness on the opposed major sides of the conductive substrate.

35. The apparatus of claim 1 wherein the adjustable distance between the first and second distal plate ends and the first and second rollers ranges from about 0.020 inches to about 0.25 inches.

36. The apparatus of claim 1 wherein at least a portion of the first and second hopper sidewalls extend downwardly and inwardly to the first and second lower edges in the closely-spaced relationship with the respective first and second calendar rollers.

37. The apparatus of claim 22 wherein the adjustable distance between the first and second distal plate ends and the first and second rollers ranges from about 0.020 inches to about 0.25 inches.

38. An apparatus for contacting an electrically conductive material to a collector substrate, the apparatus comprising:
 a) a calender hopper containing the electrically conductive material and comprising a hopper sidewall extending from an open upper end to first and second lower edges thereof;
 b) a pair of side-by-side first and second counter rotatable calender rollers, wherein the first and second lower edges of the hopper sidewall are in a closely-spaced relationship with respective ones of the first and second calendar rollers at locations spaced from a nip there between;

c) a gate comprising first and second side-by-side gate plates dividing the calender hopper into a first hopper portion and a second hopper portion, wherein the first and second gate plates provide an axial path from a proximal gate end that receives a leading end of the collector substrate to a distal gate end comprising first and second distal plate ends provided in an adjustable, spaced relationship at locations above the nip, but axially distal of an imaginary horizontal line defined by the first and second lower edges of the hopper sidewall provided in the closely-spaced relationship with the respective first and second rollers; and d) wherein the collector substrate is moveable in an axial direction through the gate from the proximal gate end to the distal gate end by counter rotatable movement of the first and second rollers contacting opposed major sides of the collector substrate at the nip of the rollers with a regulated quantity of the electrically conductive material being contactable from the first and second hopper portions to the opposed major sides of the collector substrate by adjusting a calender distance between the first and second distal plates ends and the respective first and second rollers.

39. The apparatus of claim 38 wherein the adjustable distance between the first and second distal plate ends and the first and second rollers ranges from about 0.020 inches to about 0.25 inches.

40. The apparatus of claim 38 wherein at least a portion of the first and second hopper sidewalls extend downwardly and inwardly to the first and second lower edges in the closely-spaced relationship with the respective first and second calendar rollers.

* * * * *